May 22, 1956 S. B. CLAY 2,746,695
FISHING REEL
Filed March 11, 1952
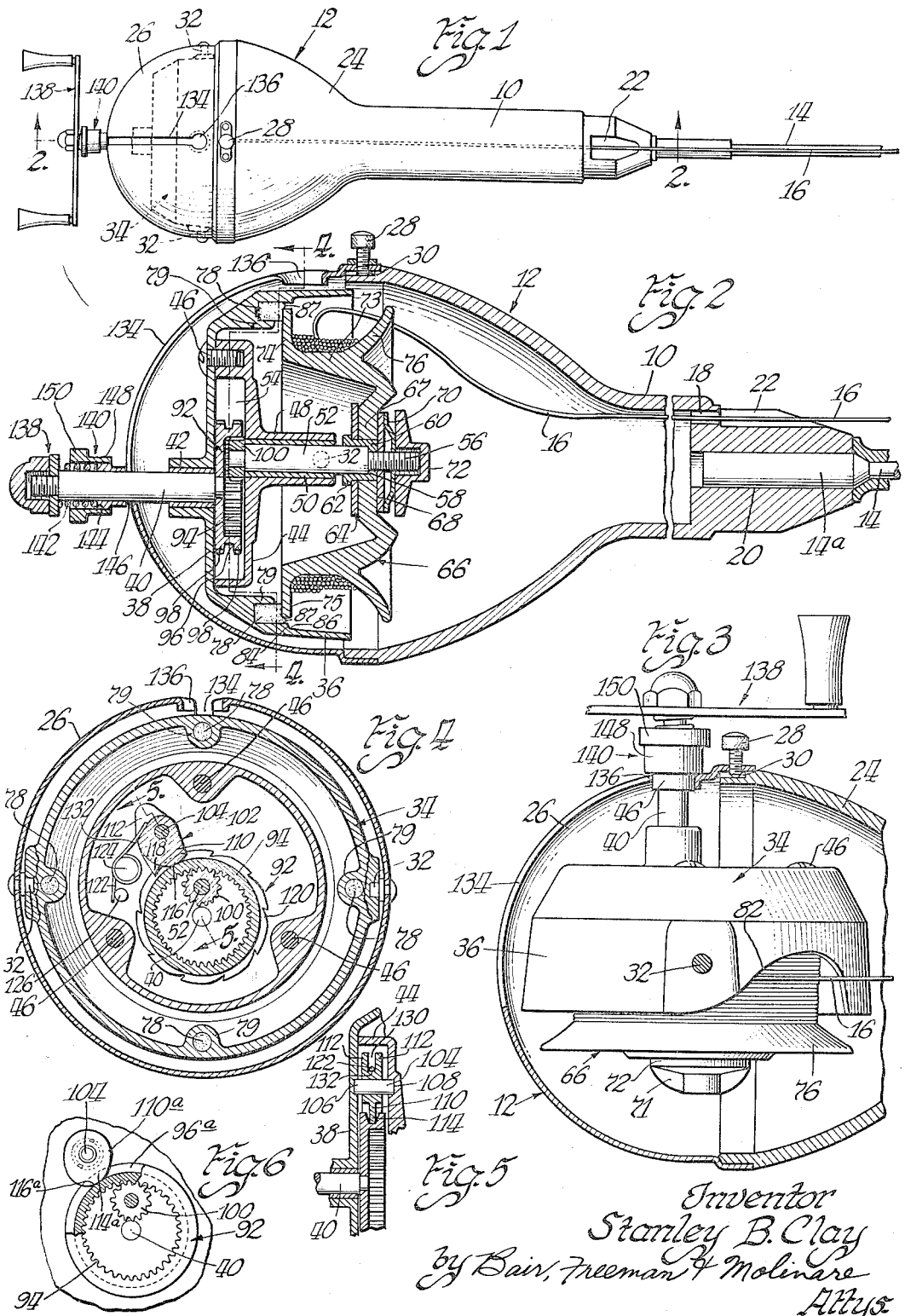
Inventor
Stanley B. Clay
by Bair, Freeman & Molinare
Attys

United States Patent Office 2,746,695
Patented May 22, 1956

2,746,695
FISHING REEL

Stanley B. Clay, Northfield, Minn., assignor to Great Lakes Products, Inc., Detroit, Mich., a corporation of Michigan Application March 11, 1952, Serial No. 275,959

2 Claims. (Cl. 242—84.5)

This invention relates to fishing apparatus and more particularly to fishing apparatus using spinning type reels.

A spinning type reel is one wherein the reel upon which the fish line is wound is positioned with the axis of the reel parallel to the fishing rod so that the fish line winds off one end of the reel while the reel is maintained stationary. This type of unreeling eliminates the possibility of backlash and also eliminates the friction which necessarily accompanies those reels wherein the reel rotates when the line is being cast out.

In spinning type reels, there are two general methods of providing for reeling up the cast-out line. In one type of apparatus, the reel is maintained in the spinning position and a rotatable member winds up the fish line on the reel; while in the second type of reeling-up apparatus, the reel is pivotable from the spinning position to a reeling position wherein the axis of the reel is transverse to the axis of the fishing rod, or is in what may be referred to as a normal reeling position. This latter spinning type fishing apparatus wherein the reel is pivotable to a reeling position is found, for example, in the Lind Patent No. 2,299,156.

There are a number of problems that accompany the use of the spinning type fishing reel which is pivotable to a reeling position. One of the problems is to insure that the reel is rotated in the proper direction for the purpose of picking up or winding up the cast-out fishing line. This problem lends itself to a solution in the spinning type fishing apparatus because it is not required to have the reel rotatable when the line is spinning out. In other words, it is desirable in spinning type reels to provide a reel which is rotatable in but one direction, namely, the direction in which the fish line is wound up upon the reel.

Thus, one of the objects of this invention is to provide a spinning type fishing reel which is rotatable in only one direction, and that for the purpose of winding up the fish line.

Another object of this invention is to provide a novel ratchet mechanism which is applicable for use with spinning type fishing reels for the purpose of permitting rotation of the fishing reel in only one direction.

Another object of the invention is to provide a fishing reel of the class described in which simple and efficient brake mechanism is associated with the speed increasing portion between the reel handle and the spool for quick action to prevent reverse unwinding rotation of the spool and for quick release of the brake on forward winding motion thereof.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is an elevation view of the handle portion and reel-enclosing shell of the spinning type fishing apparatus, with the apparatus in spinning position;

Figure 2 is an enlarged cross-section view taken substantially one line 2—2 of Figure 1, showing the reel in position when used for spinning;

Figure 3 is a view similar to Figure 2, showing the reel in elevation, with the reel pivoted to the reeling position;

Figure 4 is a cross-section view taken substantially on line 4—4 of Figure 2 and showing details of the ratchet mechanism;

Figure 5 is a cross-section view of the ratchet mechanism and is taken substantially on line 5—5 of Figure 4; and Figure 6 shows a modified form of the ratchet mechanism.

Referring now to the drawings, there is shown in Figure 1 fishing apparatus which includes a handle 10 therefor, a shell, generally indicated at 12, connected to one end of the handle 10 and housing the reeling apparatus therein, and a fishing rod 14 connected to the other end of handle 10. The fishing line 16 extends from the reeling apparatus within shell 12, through the tubular handle 10, through a passageway 18 in handle 12, and extends parallel to the fishing rod 14.

The handle 12 has a bore 20 therein, into which is press-fit the stem portion 14a of fishing rod 14. A portion of the surface of handle 12 adjacent passageway 18 is recessed at 22 and the fishing line 16 coming through passageway 18 passes thereover. The playing-out of the line 16 may be controlled by the thumb of the fisherman clamping the line 16 against the recessed surface 22.

The shell 12 is formed by two mating portions. The upper portion 24 of shell 10 is integral with handle 10. The lower portion 26 of shell 12 has the reel apparatus mounted therein. The lower portion 26 of the shell is attached to the upper portion 24 of the shell by means of pin and bayonet slots (not shown), and by a set screw 28 carried by lower shell portion 26 and adapted to enter recess 30 in upper shell portion 24, to fix the two portions of the shell together.

The reeling apparatus is journalled on pivot pins 32 which are mounted in lower shell portion 26. The reeling apparatus includes a cup-shaped shield 34 pivoted on pins 32 and having a substantially cylindrical side wall 36 and a bottom wall 38. A drive shaft 40 extends through the bottom 38 of the shield 34 and is adapted to extend outwardly through the shell 26. The drive shaft 40 is journalled in a bearing 42 carried by shield 34.

A cup-shaped member 44 is supported on the inside of bottom wall 38 and is secured to wall 38 by screws 46. This cup-shaped member 44 provides a sleeve support 48 for a bearing 50 within which a reel shaft 52 is journalled. The cup-shaped member 44 and the bottom wall 38 bound therebetween a chamber 54 within which are positioned the operative drive connections between reel shaft 52 and drive shaft 40.

Referring now to the details of connection of the line reel to the reel shaft, one end of reel shaft 52 is reduced and threaded as at 56. The reduction of shaft 52 forms a shoulder 58 on shaft 52. A bearing sleeve 60 is fitted over the reduced threaded end of shaft 52 and engages shoulder 58 so as to be axially fixed in position. This bearing sleeve 60 is flanged at 62. An annular washer 64 is positioned concentrically on sleeve 60 and is in bearing engagement with flange 62. The washer 64 is retained in position by being press-fit on sleeve 60.

A fish line spool 66 is mounted on sleeve 60 with its hub 67 in engagement with washer 64. The hub 67 of spool 66 is clamped between washers 68 and 64 so that spool 66 will rotate with reel shaft 52. Washer 68 is clamped against hub 67 by means of spring washer 70 and threaded thumb nut 72. The reduced portion 56 of reel shaft 52 is non-circular as are the axial apertures of washers 68 and 70 through which reduced portion 56 passes and thus the washers 68 and 70 are non-rotatable with respect to shaft 52. A thumb nut 72 is provided with flanges 71 adapted to be grasped by the fingers for tightening nut 72.

The line spool 66 has a central portion 73 upon which the fish line 16 is adapted to be wound. The central portion of spool 66 is bounded axially by an inner flange 74 and an outer flange 76, located respectively inwardly and outwardly with respect to shield 34.

The shield 34 is provided with a plurality of felts 78 which are secured in bosses 79 of shield 34 and which are in bearing engagement with the inwardly facing side 80 of inner flange 74. The bearing engagement of spool 66 with felts 78 permits rotation of reel 66 within shield 34. The shield is also provided with a recess 82 in the side wall 36 thereof, shown in Figure 3, through which the line passes as it is reeled onto reel 66.

The inner surface of the cylindrical wall 36 of shield 34 has a shoulder 84 formed thereon. The shoulder 84 presents an annular surface 86 which faces in the direction outwardly of the shield 34. This surface 84 lies substantially in the same plane as the outwardly facing surface 75 of inner flange 74.

The sizes of the inner flange 74 of spool 66 and the shoulder 84 in shield 34 are so designed that the edge of flange 74 is spaced as closely as possible to the shoulder 84. There is, nevertheless, an annular gap 87 between flange 74 and shoulder 84.

When the spool is in the spinning position, shown in Figure 2, some of the loops of line 16 on reel 66 tend to expand outwardly and fall off the reel. As explained above, if these loops get behind the reel they usually become entangled with shaft 52 or the sleeve support 48 therefor. In the instant arrangement, when loops of line 16 expand and engage side wall 36 of shield 34 and tend to get behind spool 66, they are supported by surface 86 of shoulder 84 and are thus prevented from getting behind spool 66. Even if a loop of line 16 gets into gap 87 between flange 74 and shoulder 84, the felts 78 bridging the gap 87, as seen in Figure 2, prevent the line from getting behind spool 66.

The operative drive connections between drive shaft 40 and reel shaft 52 are provided within chamber 54. The axis of drive shaft 40 is offset from the axis of reel shaft 52. The drive shaft 40 has a wheel 92 mounted thereon which has an internal gear 94 formed therein. The outer edge of wheel 92 is grooved at 96 thus providing two rims 98. The reel shaft 52 has a gear 100 mounted thereon and in driving engagement with inner gear 94 of wheel 92. This provides that the rotation of reel shaft 52 is in the same direction as the rotation of drive shaft 40.

Also positioned in chamber 54 is a cam member 102 pivoted on a pin 104 which is journalled in recesses 106 and 108 located respectively in bottom wall 38 and cup-shaped member 44. The cam 102 includes a central cam plate 110 and two axially spaced outer ratchet plates 112. The toe portion 114 of cam plate 110 extends into groove 96 and has an enlarged cam edge 116 adapted to jam against the walls of groove 96. The outer plates 112 carry ratchet teeth 118. The rims 98 of wheel 92 are notched at 120 to receive teeth 118 of ratchet plates 112.

A spring 122 mounted on stud 124 and anchored at one end against stud 126 has a free end positioned in slot 130 between ratchet plates 112. This positions the free end of spring 122 in engagement with the cam-type edge 132 of cam plate 110 so as to bias the ratchet teeth 118 in a direction where they will engage the notches 120 in wheel 92.

As seen in Figure 4, when the direction of rotation of the wheel 92 is clockwise, the teeth 118 will be engaged by notches 120 which will cause the enlarged cam edge 116 of cam plate 110 to jam against the bottom of groove 96 in wheel 92. This will prevent rotation of wheel 92 in a clockwise direction. When the wheel 92 is rotated in a counterclockwise direction, the enlarged cam edge 116 is displaced from the geometrical line between the axes of members 104 and 40, and this will release the cam 110 from jamming engagement with wheel 92, and will permit rotation of wheel 92 so that the spool may be rotated.

In the modified form shown in Figure 6, the spring is eliminated as are the toothed ratchet plates and the notches in the rims of wheel 92. The frictional engagement of toe portion 114a of cam 110a with the walls of the notch 96a is sufficient to bring the enlarged cam edge 116a into jamming position with wheel 92 so as to prevent rotation in the clockwise direction. Rotation of wheel 92 in the counterclockwise direction will displace the enlarged cam edge 116a from the geometrical line between the axes of pin 104 and shaft 40 and will thus release the wheel 92 to permit rotation thereof.

Referring to the means for pivoting the reeling apparatus from spinning position to reeling position and vice versa, the drive shaft or winding shaft 40 extends outwardly through the lower portion 26 of shell 12. The lower portion 26 of shell 12 is provided with an elongated slot 134 adapted to accommodate the swinging of shaft 40 from spinning position to reeling position. The slot 134 is enlarged at least at one end thereof to form a hole 136 of generally circular contour and of larger diameter than the width of slot 134.

The shaft 40 is provided at its outer end with a handle 138, and also has, concentrically mounted thereon, a spring biased ferrule 140 positioned between handle 138 and the outer surface of shell 12. A spring 142, concentric with shaft 40, is positioned between handle 138 and internal shoulder 144 of ferrule 140, and biases ferrule 140 towards shell 12.

The inner end 146 of ferrule 140 is of greater dimension than the width of slot 134 and of smaller dimension than the diameter of hole 136 and thus when the shaft 40 is in the reeling position, shown in Figure 3, the ferrule has entered hole 136 and is seated therein, so as to lock shaft 40 in position relative to shell 12; and when the shaft 40 is in spinning position or in any position intermediate reeling and spinning, the ferrule 140 is in resilient bearing engagement with the surface of shell 12. The bearing engagement of ferrule 140 with the surface of shell 12 provides frictional resistance for retaining the shaft 40 in a desired position along slot 134.

The outer surface of ferrule 140 has shoulders 148 and 150 formed therein. Shoulder 148 is adapted to engage shell 12 to limit the entrance of ferrule 140 into hole 136; and shoulder 150 provides means adapted to be grasped for withdrawing ferrule 140 from hole 136. After ferrule 140 has been withdrawn from hole 136, the shaft 40 may be swung through slot 134 to the desired position.

The ferrule 140 when seated in hole 134 provides a bearing for shaft 40, as shaft 40 is rotated for winding up line 16 on reel 66. Although slot 134 is shown provided with hole 136 at the reeling end, it is evident that a similar hole could be provided at the other end of slot 134 adapted to lock the shaft 40 in the spinning position.

It will, of course, be understood that various changes may be made in the form, details, proportion and arrangement of the various parts without departing from the scope of my invention.

What I claim as new, and desire to secure by Letters Patent of the United States, is:

1. Apparatus for reeling up a fish line that has been cast, said apparatus comprising a rotatably mounted spool, a rotatable shaft operatively associated with said spool for rotating said spool, a cam member pivotally mounted on an axis offset from the axis of said shaft, a wheel concentrically mounted on said shaft and having an internal gear formed therein, a gear operatively associated with said spool and in driving engagement with said internal gear, a groove in the outer edge of said wheel, a portion of the edge of said cam member being positioned in said groove and adapted to engage the sides and bottom of said groove, and a jamming enlargement of said cam member being offset from the geometrical line between the axis of the cam and the axis of the shaft, the sides and edges of said cam and wheel groove being in frictional engagement, said jamming enlargement being pivotal toward said geometrical line when it is attempted to rotate the shaft in one direction, whereby jamming is caused between the cam and wheel, said cam member being displaced from said jamming position when the shaft is rotated in the opposite direction, whereby rotation of the spool is permitted in only winding direction, ratchet means on said wheel spaced axially of said groove, and ratchet means on said cam member spaced axially of said jamming portion and adapted to engage the means on said wheel, whereby when it is attempted to rotate the wheel in unwinding direction there is positive interengagement between the ratchet means on the wheel and on the cam to cause the jamming portion of the cam to positively bind against the wheel.

2. Apparatus for reeling up a fish line that has been cast, said apparatus comprising a rotatably mounted spool, a rotatable shaft operatively associated with said spool for rotating said spool, a cam member pivotally mounted on an axis offset from the axis of said shaft, a wheel concentrically mounted on said shaft and having an internal gear formed therein, a gear operatively associated with said reel and in driving engagement with said internal gear, a groove in the outer edge of said wheel, a portion of the edge of said cam member being positioned in said groove and adapted to engage the sides and bottom of said groove, and a jamming enlargement of said cam member being offset from the geometrical line between the axis of the cam and the axis of the shaft, the sides and edges of said cam and wheel groove being in frictional engagement, said jamming enlargement being pivotal toward said geometrical line when it is attempted to rotate the shaft in one direction, whereby jamming is caused between the cam and wheel, said cam member being displaced from said jamming position when the shaft is rotated in the opposite direction, whereby rotation of the spool is permitted in only one direction, ratchet means on said wheel spaced axially of said groove, ratchet means on said cam member spaced axially of said jamming portion and adapted to engage the means on said wheel, whereby when it is attempted to rotate the wheel in unwinding direction there is positive interengagement between the ratchet means on the wheel and on the cam to cause the jamming portion of the cam to positively bind against the wheel, and spring means biasing the cam member around its pivotal axis so that the ratchet means thereon are biased towards a position where they are adapted to engage with the ratchet means on said wheel.

References Cited in the file of this patent

UNITED STATES PATENTS

| | | |
|---|---|---|
| 744,454 | Allen | Nov. 17, 1903 |
| 1,073,728 | Atwood | Sept. 23, 1915 |
| 1,603,306 | Adams | Oct. 19, 1926 |
| 1,813,275 | Burdick | July 7, 1931 |
| 1,882,771 | Burdick | Oct. 18, 1932 |
| 2,299,156 | Lind | Oct. 20, 1942 |
| 2,489,614 | Brikoff | Nov. 29, 1949 |
| 2,569,770 | McFate | Oct. 2, 1951 |

FOREIGN PATENTS

| | | |
|---|---|---|
| 238,957 | Switzerland | Dec. 3, 1945 |